United States Patent

[11] 3,569,827

| [72] | Inventors | Hugh L. Dryden<br>Deputy Administrator of the National Aeronautics and Space Administration with respect to an invention of;<br>Jack C. Miller |
|---|---|---|
| [21] | Appl. No. | 508,169 |
| [22] | Filed | Nov. 16, 1965 |
| [45] | Patented | Mar. 9, 1971 |

[54] APPARATUS FOR DETECTING THE AMOUNT OF MATERIAL IN A RESONANT CAVITY CONTAINER
7 Claims, 2 Drawing Figs.

[52] U.S. Cl. .................................................. 324/58.5, 324/61
[51] Int. Cl. .............................................. G01r 27/04
[50] Field of Search ........................................ 324/58, 58.5, 62.1, 61; 331/15

[56] References Cited
UNITED STATES PATENTS

| 2,451,858 | 10/1948 | Mork | 324/62(.1)X |
| 2,923,893 | 2/1960 | Runyan | 331/15X |
| 3,252,081 | 5/1966 | Ruddock et al. | 324/0.5(F) |
| 3,271,667 | 9/1966 | Czerlinsky | 324/58 |
| 2,523,363 | 9/1950 | Gehman | 324/61X |
| 2,613,249 | 10/1952 | Babb | 324/61 |
| 2,963,642 | 12/1960 | Arbogast et al. | 324/61X |
| 3,028,548 | 4/1962 | Breen | 324/61 |

Primary Examiner—Edward E. Kubasiewicz
Attorneys—G. T. McCoy, J. H. Warden and Monte F. Mott ABSTRACT: The mass of a dielectric material contained in an internal cavity of a metallic container, and therefrom the quantity of said material in said container, is determined by connecting the container as the positive feedback impedance of an amplifier. Losses are supplied to enable the arrangement to oscillate at the frequency of resonance of said container. This frequency varies with the mass of dielectric material in the container. Accordingly, from the resonant frequency, one can determine the amount of said material which is present.

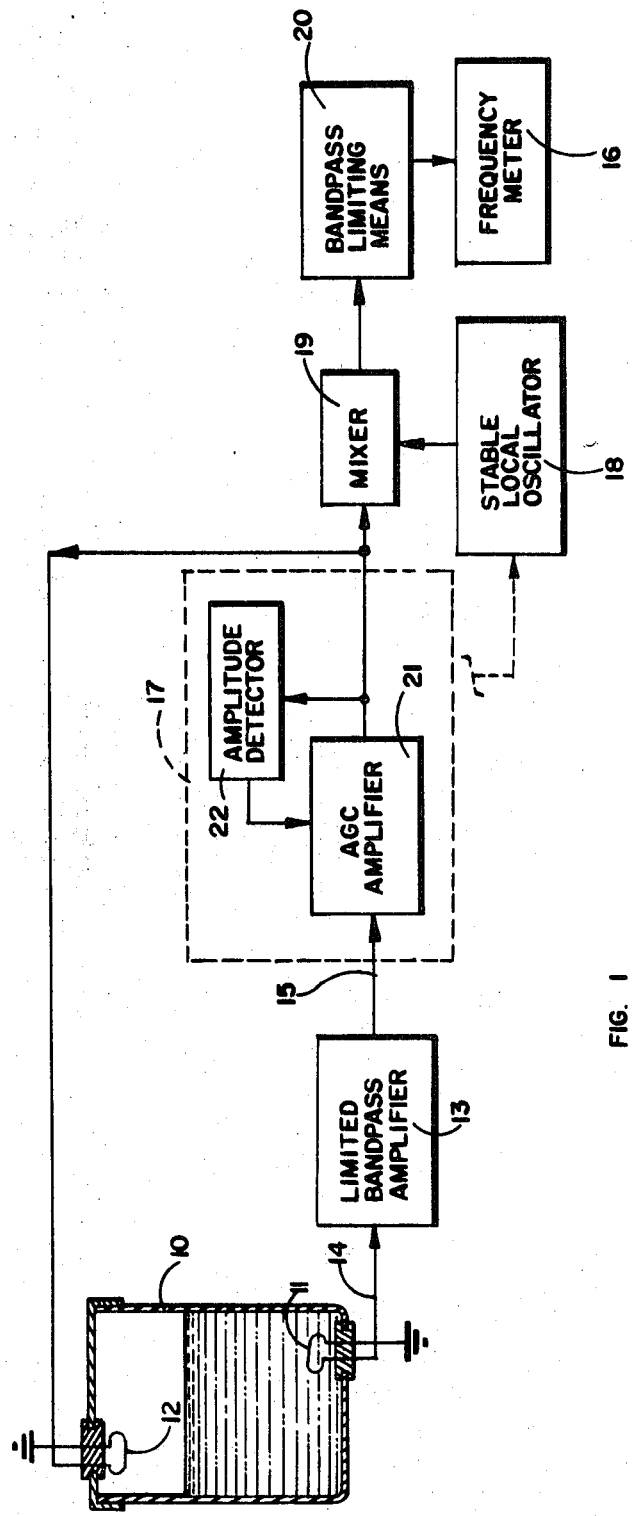

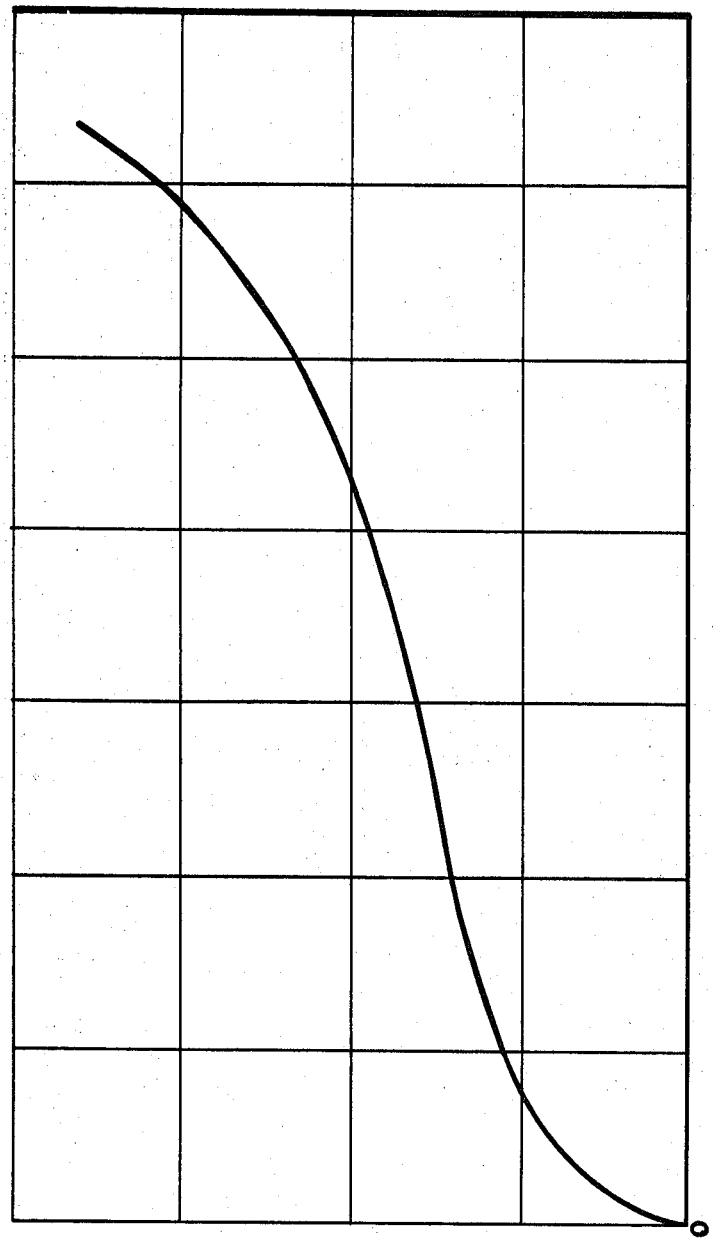

APPARATUS FOR DETECTING THE AMOUNT OF MATERIAL IN A RESONANT CAVITY CONTAINER

ORIGIN OF INVENTION

The invention described herein was made in the performance of work under a NASA contract and is subject to the provisions of Section 305 of the National Aeronautics and Space Act of 1958, Public Law 85-568 (72 Stat. 42 USC 2457).

The subject invention relates to means for determining the mass of a liquid, and more particularly to apparatus cooperating with a resonant cavity for determining the mass of a dielectric material confined in such cavity.

The mass of a confined dielectric pourable material is frequently desired to be known or determined under conditions in which it is inconvenient to directly weigh such material. For example, the amount of liquid fuel, at any given moment, in a fuel tank may be desired to be known in connection with the performance of an energy management function in a space flight mission, although the mass of other electrically nonconductive fluids may be desired to be known in connection with any inventory function.

In the prior art, several types of devices have been employed for indirectly determining the quantity of a pourable mass or fluid in a container. Such methods have included multiple frequency or swept frequency ultrasonic transducer means located inside the top of a container for measuring the level of an energy-reflective fluid located beneath the location of such transducers, as shown for example in U.S. Pat. No. 2,960,678 issued Nov. 15, 1960 to R. B. Beard, et al. for Ultrasonic Level Measuring Apparatus; and U.S. Pat. No. 3,050,720 issued Aug. 21, 1962 to S. R. Rich for System Sensing A Change On An Ambient Condition. Such liquid level measuring means are of limited effectiveness in indirectly determining the mass of confined liquid, because of variations in measurements occurring due to liquid surface effects (such as fuel sloshing), tilting of the container in a gravitational environment, and due to changes in fluid density associated with variations in temperature and pressure conditions.

Other prior art devices have merely indicated the deviation of the amount of a confined dielectric mass from a preselected amount, utilizing the confined dielectric mass as a load impedance driven by an oscillator, as taught by U.S. Pat. No. 2,523,363 issued Sept. 26, 1950 to John B. Gehman for Method and Apparatus for Filling Containers with a Predetermined Amount of Dielectric Material. In the arrangement of Gehman, the load current to the fixed frequency oscillator is observed to be a minimum when the resonant frequency of the load impedance is equal to that of the oscillator, the preselected oscillator frequency being selected as that for which a minimum load current or associated mutual resonance of load and oscillator corresponds to a desired liquid level condition. Similar means, employing a fixed frequency oscillator for determining the occurrence of a discrete liquid level is also taught in U.S. Pat. No. 2,584,128 issued Feb. 1952 to J. M. Hildyard for Liquid Level Apparatus. An obvious disadvantage of such devices for indicating the coincidence of a liquid level with a preselected liquid level is the inability to conveniently, simply and accurately determine the liquid mass associated with other than such discrete condition of coincidence.

By means of the concept of the subject invention, such disadvantages of the prior art are overcome, and improved means is provided for determining the mass of a confined dielectric material.

In a preferred embodiment of the invention, there is provided a radio frequency resonant cavity adapted for storing or confining a mass of a preselected dielectric, pourable material. There is also provided feedback coupled amplifying means, an element of the feedback impedance of which includes the resonant cavity.

In normal operation of the above described arrangement, the output signal of the amplifier excites the cavity resonator or container, which resonates at a frequency determined by the effective geometry of the cavity and the mass of the dielectric material contained therein. The closed-loop cooperation of the amplifier and impedance of the container tend to sustain such oscillations, and hence, cooperate as an oscillator, the frequency of which is indicative of the mass of confined dielectric material. Because such frequency is indicative of the dielectric mass, frequency-measuring means may be provided and calibrated to be read directly in terms of the mass of a preselected dielectric material for a given container.

Because the impedance of the resonant cavity is used as a feedback impedance for an amplifier rather than as a load impedance for a fixed frequency oscillator, the frequency of the resulting oscillator combination being indicative of the dielectric mass, to the device overcomes the limitations of those prior devices which are indicative of only the coincidence of an actual and a preselected mass. Further, because the device of the invention does not rely upon the reflection of transmitted energy from a liquid surface or interface, it is less subject to errors due to free surface effects, attitude of the cavity in a gravitational environment, and the effects of temperature and pressure. Accordingly, it is an object of the subject invention to provide means of improved accuracy for indirectly determining the mass of a confined dielectric pourable material.

It is another object of the invention to provide means for determining the mass of a dielectric fluid by other than measuring the level thereof.

It is still another object of the invention to provide means for determining the mass of a confined dielectric material which means is substantially insensitive to the attitude of the container confining said material.

It is yet another object of the invention to provide means for conveniently determining the mass of a dielectric material confined within a radio frequency resonant cavity.

It is a further object of the invention to provide radio frequency resonant cavity means for determining the mass of a dielectric material.

These and further objects of the drawings will become apparent from the following specification, taken together with the accompanying drawings in which:

FIG. 1 is a schematic arrangement of a system embodying the concept of the invention; and FIG. 2 is a graph of the frequency response of the system of FIG. 1 as a function of confined dielectric material.

In the figures, like reference characters refer to like parts.

Referring now to FIG. 1, there is illustrated in schematic form a system embodying the concept of the invention. There is provided a container 10 for confining a pourable dielectric mass or a dielectric fluid, such as a cryogenic fuel. Such container is preferably a fully enclosed or lidded right cylinder, and constructed of a metal or electrically conductive material. Such container may include valving provisions for cooperation with means (not shown) for admitting and drawing off the confined fluid stored therein, and may further include venting valve means for pressure equalization, as is well understood in the art. Mounted in a mutually spaced relation within container 10 are a pair of radio frequency probes 11 and 12, each preferably located at either axial end of container 10 and radially spaced so that the cooperation of probes 11 and 12 and container 10 in electrical circuit define a radio frequency resonant cavity or R.F. impedance. There is also provided a broadband radio frequency amplifier 13 having an input and an output terminal 14 and 15, each terminal being connected in circuit to a mutually exclusive one of probes 11 and 12.

In normal operation of the above-described arrangement, the thermal noise output of amplifier 13 is coupled by probe 12 to R.F. cavity 10 and initially excites the resonant cavity provided by container 10. Such excitation of an electromagnetic energy mode in container 10 is coupled or fed back by probe 11 as an input to amplifier 13. Hence, amplifier 13 cooperates as a feedback coupled amplifier; and resonant cavity 10 cooperates as a feedback impedance. Such input to amplifier 13 is then amplified and fed to resonant cavity 10 to sustain the radio frequency oscillations propagated therein, the feedback coupled amplifier 13 and cavity resonator 10 cooperating as a radio frequency oscillator, the frequency of which is determined, in a large measure, by the geometry of the empty cavity resonator 10 and the effective dielectric constant of the cavity.

It is to be appreciated that for an empty cavity (or one filled with only atmospheric air), the cavity will provide a characteristic impedance or resonant mode which, in feedback cooperation with amplifier 13, results in an associated oscillator frequency. As the cavity or container is filled with a dielectric fluid to be stored or confined therein, the resultant change in the effective dielectric constant of the cavity produces a change in the characteristic electrical impedance thereof and a corresponding change in the oscillator frequency. In other words, a change in the amount of confined fluid of a selected type produces an associated change in frequency, as shown in FIG. 2.

Referring to FIG. 2, there is illustrated a graph of the representative frequency response of an oscillator of the type described as a function of a dielectric fluid confined there, and showing that the difference ($\Delta f = f_0 - f_t$) between an actual frequency condition of the oscillator and that associated with an empty condition of the cavity, increases as the confined mass increases. In other words, as the tank fills, the increase in dielectric mass (and hence in the effective dielectric constant) results in a decrease in the resonant frequency.

It has been discovered that the frequency associated with a given mass of a selected type of dielectric in a given resonant cavity or metallic container, is substantially constant under changes in attitudes of the container, and under changes in pressure and temperatures of the liquid, as to provide efficient means for measuring the mass of such liquid. Further, because the frequency response of the resonant cavity is substantially determined by the effective dielectric constant of the confined mass, rather than the distribution thereof, the response of the measuring means of FIG. 1 is substantially unaffected by free surface effects or fuel sloshing.

The frequency of the oscillator arrangement of FIG. 1 may be measured by radio frequency-measuring means 16 responsively coupled to the output of amplifier 13. Such frequency-measuring devices are well known in the art and element 16 is therefore shown in block form only for convenience in exposition.

In order that the cavity resonator and amplifier combination of FIG. 1 operates satisfactorily over the range of resonant cavity frequencies represented by an empty condition of cavity 10 and a full condition for a selected dielectric, it is necessary that the amplifier provide sufficient gain with a minimum amount of phase shift over the frequency range of interest. A convenient way of meeting such condition is to design the amplifier for a bandpass which includes such range of frequencies and has a center frequency corresponding to the center frequency of such range of resonant frequencies for the empty and filled conditions of cavity 10. In this way, a suitable compromise may be more easily obtained in impedance matching the cables interconnecting the amplifier and resonant cavity. A further bandwidth impedance-matching device may be incorporated in the amplifier stage by means of the inclusion of an automatic gain control stage 17, comprising a gained controlled amplifier 21 having a control input thereof coupled to means 22 for providing a gain control signal indicative of the amplitude of the output of amplifier 21, the design of which is well understood in the art, as indicated for example in FIG. 1 of U.S. Pat. No. 3,165,740 issued Jan. 12, 1965 to W. E. Stoney for a Terrain Clearance Radar or at page 459, Section 12.8 (FIG. 12.5) of Volume I of the Radiation Laboratory series.

As discussed in connection with the description of FIG. 2, the frequency shift from the empty cavity resonant frequency condition caused by the confinement of a selected mass or amount of a dielectric fluid in cavity 10 is indicative of such mass or amount. Accordingly, means is further provided in the arrangement of FIG. 1 for directly measuring such frequency shift.

Referring again to FIG. 1, there is provided a source 18 of a radio frequency $f_0$ equal to that resonant frequency associated with an empty condition of resonant cavity 10. The output of oscillator 18 is mixed with the output frequency ($f_t$) of amplifier 10 by a radio frequency mixer 19 such as a balanced modulator or like means well known in the art for mixing two radio frequencies. The resulting upper sideband output ($f_0 + f_t$) and lower sideband output ($f_0 - f_t$) of mixer 19 is then fed to bandpass limited, or low-pass amplifier 20 for suppressing the upper sideband frequency ($f_0 + f_t$) of the mixer output, while amplifying the lower sideband output frequency ($f_0 - f_t$), corresponding to the frequency of interest plotted in FIG. 2. Because the frequency-measuring means 16 may be thus made to measure the frequency shift associated with the mass of a selected type of dielectric fluid, such frequency-responsive apparatus may, if desired, be calibrated in terms of the amount of such fluid, whereby such amount or mass be indicated directly.

In a representative embodiment of the device of FIG. 1, employing, for example, a 48-inch diameter tank for cavity 10, for use with cryogenic fluids, the resonant frequency of the tank may be expected to vary from 225 megacycles per record (corresponding to an empty condition) to 160 megacycles per second (corresponding to a filled condition), which range of frequencies thus specifies the bandpass requirements of amplifier 13, and which upper frequency specifies the tuning frequency of stable local oscillator 18. Also, the difference frequency of 65 megacycles per second represented by such range of frequencies specifies the upper frequency of low-pass bandpass-limiting means 20 of FIG. 1.

Although the method and device of the invention have been described as employing a right cylinder for the resonant cavity, other shapes of cavities may be employed, by suitably positioning the R.F. probes within the cavity. Also, although the mass to be measured has been referred to alternatively as a liquid and as a pourable material, the concept of the invention is not so limited, being equally adaptable for measuring dielectric materials of amorphous or crystalline natures. Accordingly, improved apparatus has been described for determining the mass of a dielectric material by radio frequency energy means comprising a radio frequency resonant cavity containing such mass.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Radio frequency oscillator means for determining the mass of a dielectric material contained in an internal cavity of a metallic container comprising:

broadband-amplifying means having an input and an output;

a frequency-determining positive feedback impedance means directly coupled between said input and said output;

said frequency-determining feedback impedance means consisting of the internal cavity of said container and the dielectric material contained therein; and frequency-measuring means for indicating the resonant frequency condition of said amplifying means as an indication of said dielectric means.

2. Radio frequency oscillator means for determining the mass of a dielectric material comprising:

a frequency-determining element for said radio frequency oscillator means consisting of a metallic container having a radio frequency resonant cavity adapted to contain a dielectric material therein, the mass of which is to be determined;

broadband radio frequency amplifying means having an input and an output;

means for coupling said radio frequency resonant cavity directly between said input and output for enabling oscillations at the output of said amplifying means; and frequency-measuring means for indicating the frequency of said oscillations as a function of the mass of said dielectric material.

3. The device of claim 2 in which said amplifying means comprises automatic gain control means.

4. The device of claim 2 in which said amplifying means comprises:

a gain-controllable amplifier having a gain control input; and means responsive to the amplitude of the output of said amplifier for providing a negative feedback gain control signal to said gain control input.

5. Radio frequency oscillator means for determining the mass of a dielectric material confined in a radio frequency resonant cavity, comprising:

broadband radio frequency-amplifying means;

means for coupling said radio frequency resonant cavity as the sole frequency-determining element directly between the output and input of said amplifying means for providing oscillations at the frequency of resonance of said radio frequency resonant cavity and the dielectric material contained therein; and radio frequency means coupled to said amplifying means for indicating the resonant frequency condition of said resonant cavity and the dielectric material therein.

6. Means for determining the mass of a selected type of dielectric liquid contained in a radio frequency resonant cavity, comprising:

an oscillator, said oscillator having a broadband amplifier with an output and an input;

a frequency-determining element for said oscillator consisting of said radio frequency resonant cavity containing said dielectric liquid;

a pair of radio frequency electronic probes located within said cavity;

means coupling said amplifier output and input directly to a mutually exclusive one of said probes for causing said amplifier to produce oscillations at a frequency which is determined by said cavity and the mass of said dielectric liquid therein; and frequency-measuring means coupled to said amplifier output for measuring the resonant frequency change of said resonant frequency cavity corresponding to a change in the mass of said contained dielectric.

7. Means for determining the mass of a selected type of dielectric material contained in a radio frequency resonant cavity formed by an electrically conductive right-angle cylindrical container comprising an oscillator, said oscillator having:

a broadband amplifier having an output and an input;

a frequency-determining element for said oscillator consisting of said radio frequency resonant cavity containing said dielectric material;

means coupling said amplifier output and input directly to a respective one of said probes whereby oscillation occurs at a frequency determined by said radio frequency resonant cavity and the dielectric material contained therein;

a stable oscillator for providing a reference frequency corresponding to the resonant frequency condition of said frequency-determining element associated with an empty condition of said container;

mixing means having a first and second input responsive to the respective outputs of said amplifier and said local oscillator for providing an output frequency indicative of the frequency difference therebetween; and frequency-measuring means coupled to the output of said mixing means for providing an output signal indicative of said frequency difference and corresponding to said dielectric material mass to be measured.